(12) United States Patent
Nakata et al.

(10) Patent No.: US 6,204,475 B1
(45) Date of Patent: Mar. 20, 2001

(54) LASER MACHINING APPARATUS WITH TRANSVERSE GAS FLOW

(75) Inventors: Yoshinori Nakata; Atsushi Mori, both of Minamitsuru-gun (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 09/431,204

(22) Filed: Nov. 1, 1999

(30) Foreign Application Priority Data

Jan. 4, 1999 (JP) .................................................. 11-000085

(51) Int. Cl.⁷ .................................................. B23K 26/14
(52) U.S. Cl. .................................................. 219/121.84
(58) Field of Search ........................... 219/121.6, 121.63, 219/121.67, 121.84

(56) References Cited

U.S. PATENT DOCUMENTS

| | | | | |
|---|---|---|---|---|
| 3,742,183 | * | 6/1973 | Castro et al. ................... | 219/121.84 |
| 4,128,753 | * | 12/1978 | Sharp ............................... | 219/121.63 |
| 4,319,120 | * | 3/1982 | Rocca .............................. | 219/121.84 |
| 4,723,063 | * | 2/1988 | Armier et al. .................... | 219/121.63 |
| 5,354,964 | * | 10/1994 | Kyoren et al. ................... | 219/121.84 |
| 5,359,176 | * | 10/1994 | Balliet, Jr. et al. .............. | 219/121.84 |
| 5,770,833 | * | 6/1998 | Kanaoka et al. ................. | 219/121.67 |
| 5,981,901 | * | 11/1999 | La Rocca ........................ | 219/121.63 |

FOREIGN PATENT DOCUMENTS

| | | | | |
|---|---|---|---|---|
| 3405406 | * | 2/1984 | (DE) ............................... | 219/121.84 |
| 52-37298 | | 3/1977 | (JP) . | |
| 53-40661 | | 4/1978 | (JP) . | |
| 54-36695 | * | 3/1979 | (JP) ............................... | 219/121.85 |
| 56-151191 | | 11/1981 | (JP) . | |
| 59-064191 | | 4/1984 | (JP) . | |
| 59-163092 | * | 9/1984 | (JP) ............................... | 219/121.84 |
| 61-009990 | | 1/1986 | (JP) . | |
| 62-82193 | | 5/1987 | (JP) . | |
| 1-107994 | * | 4/1989 | (JP) . | |
| 1-118886 | | 8/1989 | (JP) . | |
| 2-84288 | | 3/1990 | (JP) . | |
| 5-5285 | | 1/1993 | (JP) . | |
| 05185266 | | 7/1993 | (JP) . | |
| 05228681 | | 9/1993 | (JP) . | |
| 07080677 | | 3/1995 | (JP) . | |
| 08318388 | | 12/1996 | (JP) . | |
| 8-510691 | | 12/1996 | (JP) . | |
| 10113786 | | 5/1998 | (JP) . | |

* cited by examiner

Primary Examiner—Samuel M. Heinrich
(74) Attorney, Agent, or Firm—Staas & Halsey LLP

(57) ABSTRACT

A laser machining apparatus capable of removing spatters and slugs produced in piercing and rising supply pressure of blow gas sufficiently without hindering a jet of assist gas. A piercing assist jig can be turned and moved up and down by a rotary air cylinder and an extendable air cylinder which are attached to a machining head. When piercing is to be performed, the piercing assist jig, which is in a position where it does not interfere with the machining nozzle and the workpiece, is turned to make a center of a hole of the piercing assist jig coincide with a center of the machining nozzle. Then the machining head is moved down to a piercing position, and the piercing assist jig is pressed on a workpiece. Then, a laser beam is irradiated and assist gas is jetted, and also blow gas is jetted from a blow gas supply opening so that the blow gas flows with the assist gas therebetween. Spatters and slugs flying up in the process of piercing are removed by the blow gas without hindering the piercing.

12 Claims, 3 Drawing Sheets

LASER MACHINING APPARATUS WITH TRANSVERSE GAS FLOW

BACKGROUND OF THE INVENTION

1. Field of the Invention

The present invention relates to a laser machining apparatus for cutting or boring a workpiece by a laser beam, and particularly to a laser machining apparatus suited for piercing a metal plate workpiece.

2. Description of Related Art

In general, laser machining is performed by irradiating a converged laser beam on a workpiece through a small hole of approximately 0.5 mm to 5 mm in diameter and also by jetting assist gas of oxygen, air, nitrogen or argon through the small hole, to perform cutting, welding, boring, etc. Also in piercing a workpiece, assist gas is generally jetted coaxially with the optical axis of a laser beam. Particularly in piercing a metal workpiece, oxygen is used as an assist gas to cause oxidization on a workpiece to facilitate piercing by utilizing a phenomenon of heating and melting associated with combustion.

Conventionally, in piercing a steel plate and the like by a laser beam, a laser beam is outputted intermittently as pulses in order to suppress melted metal flying up over a workpiece. However, the larger the plate thickness of a workpiece is, the longer time it takes to pierce the workpiece. In order to make the time required for piercing shorter, the power of a laser beam is increased and piercing is performed by outputting a laser beam continuously instead of outputting as pulses. In such manners of piercing, a large amount of spatters and slugs are formed by melted metal and metal oxide flying up over a workpiece. (Here, slugs mean lumps of melted or melted and solidified metal and metal oxide, and spatters mean particles thereof.)

Spatters and slugs adhering to the surface of a workpiece hinder cutting and the like and lower the machining precision. In order to deal with those problems, there has been proposed a method of piercing in which a jet of blow gas of air, nitrogen or the like is directed obliquely from an upper side to a machining portion to blow off produced spatters and slugs in Japanese Patent Laid-Open Publication Nos. 9-277071 and 10-225787.

In the method of piercing by jetting blow gas obliquely from an upper side to a machining portion, the blow gas is jetted transversely with respect to an optical axis of the laser beam and thus an axis of the assist gas jet. Therefore, there is a possibility that the blow gas may hinder the assist gas being supplied to the machining portion. Thus, the supply pressure of blow gas needs to be controlled in accordance with supply pressure of the assist gas.

Even if spatters and slugs can be removed effectively by controlling the supply pressure of the blow gas in accordance with the supply pressure of the assist gas optimally, there is another problem in the case where the workpiece has a large thickness. The larger thickness the workpiece has, the longer time it takes to pierce the workpiece, and therefore a pierced hole suffers deformation in the blow direction. Further, another problem may be that all the spatters and slugs cannot be removed from the workpiece because the pressure of blow gas cannot be raised sufficiently.

SUMMARY OF THE INVENTION

An object of the present invention is to provide a laser machining apparatus capable of removing spatters and slugs produced in piercing by blow gas having sufficiently increased pressure without hindering a jet of assist gas.

According to the present invention, gas jetting means is provided for supplying a jet of gas between a machining nozzle and a workpiece, and the jet from the gas jetting means forms at least two streams that do not intersect the laser beam and the assist gas jet which passes between the streams, to remove spatters and slugs produced in the piercing. The streams flowing, with the laser are formed by providing at least two gas jetting openings, or by providing shielding means for shielding the jet of gas from the gas jetting means so that an axis of the jet of gas does not intersect an optical axis of the laser beam and an axis of the assist gas jet.

BRIEF DESCRIPTION OF THE DRAWINGS

FIG. 3b is a cross-sectional view along a line indicated by an arrow IIIb in FIG. 3a.

DETAILED DESCRIPTION OF THE PREFERRED EMBODIMENTS

Figure 1A:
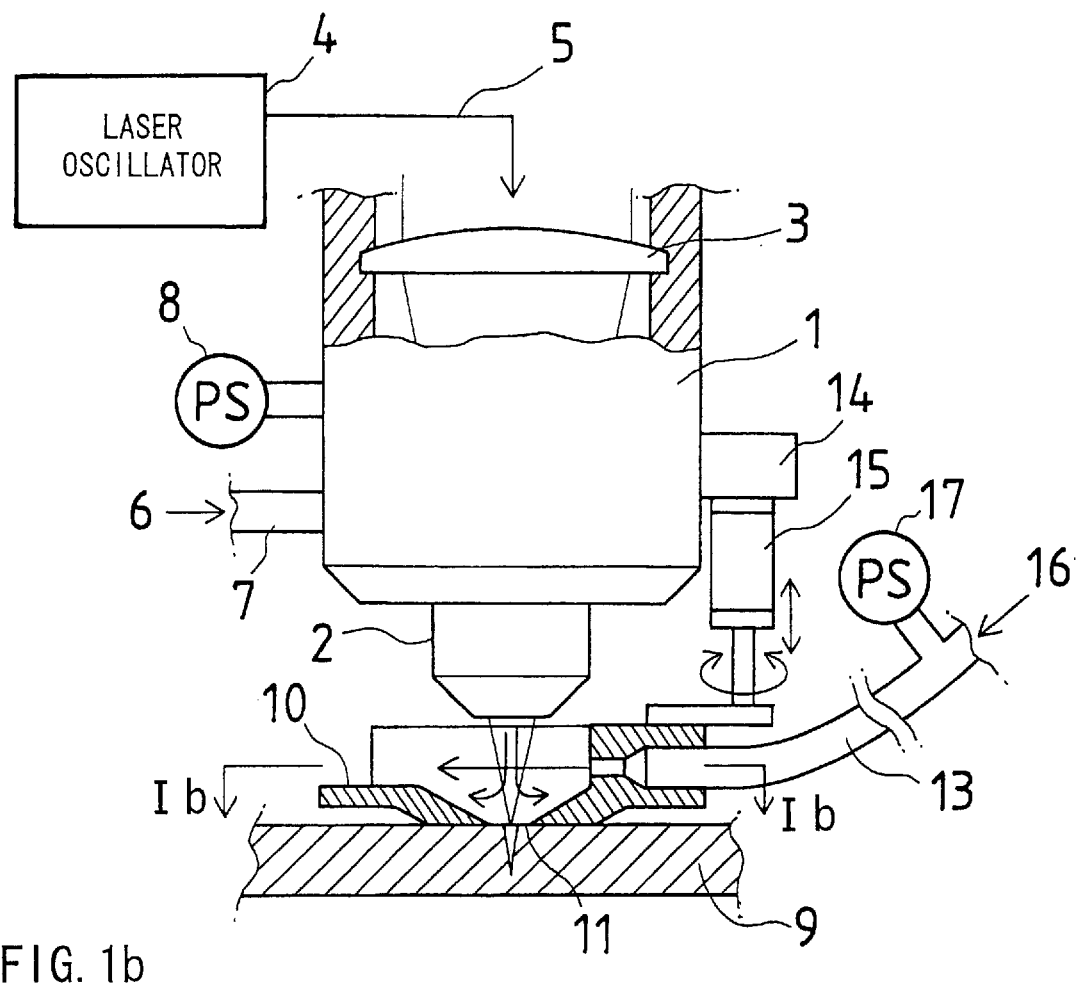
FIG. 1a is a partially cutaway side view of a laser machining apparatus according to a first embodiment of the present invention.
Figure 1B:
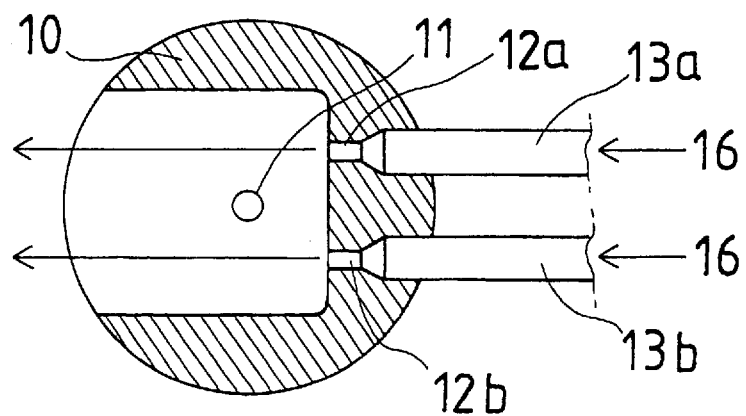
FIG. 1b is a cross-sectional view along a line indicated by arrows Ib—Ib in FIG. 1a, FIG. 2a is a sectional side view of a laser machining apparatus according to a second embodiment of the present invention.

FIG. 1a is a schematic view of an embodiment of the present invention, and FIG. 1b is a cross-sectional view as viewed in the direction indicated by arrows Ib—Ib in FIG. 1a. A machining nozzle 2 is fixed to a machining head 1 of a laser machining apparatus by screws and the like. A convergent lens 3 is provided in the machining head 1. A laser beam 5 generated by a laser oscillator 4 is converged by the convergent lens 3, passes through a hole of the machining nozzle 2 and irradiated on a workpiece 9. An assist gas inlet 7 is provided at the machining head 1 between the convergent lens 3 and the machining nozzle 2. Assist gas 6 introduced from the assist gas inlet 7 into the machining head 1 is jetted through the hole at the end of the machining nozzle 2 to the workpiece 9. The supply pressure of the assist gas 6 is detected by a pressure sensor 8.

Further, a rotary air cylinder 14 is attached to the machining head 1, an extendable air cylinder 15 is joined to an output shaft of the rotary air cylinder 14, and a piercing assist jig 10 is joined to the end of a piston rod of the extendable air cylinder 15. The piercing assist jig 10 is made of copper so that slugs and the like of melted steel or stainless steel produced in the process of piercing a steel or stainless steel plate will not adhere to the piercing assist jig 10. As shown in FIG. 1b, in the present embodiment, the piercing assist jig 10 is in the shape of a disk whose central portion is cut out to form a rectangular hollow. The rectangular hollow is open on one side. Two blow gas jetting openings 12a, 12b for jetting blow gas 16 are formed on the side opposite to the open side of the piercing assist jig 10, and pipes 13a, 13b for supplying the blow gas 16 are connected to the blow gas jetting openings 12a, 12b. A hole 11 (for example, about 4 mm in diameter) is formed through the piercing assist jig 10 at its center in order to let the concentrated laser beam through. A hole having a gradually enlarging diameter extends from the hole 11 to the base of the rectangular hollow. The blow gas is jetted from the blow gas jetting openings 12a, 12b so that the jetted blow gas may flow along parallel axes which extend with the hole 11 therebetween. Those axes are also parallel with the sides of the rectangular hollow other than the side at which the blow gas jetting openings 12a, 12b are provided.

Reference numeral 17 denotes a pressure sensor for detecting the supply pressure of the blow gas.

FIG. 1a shows the apparatus in a state of performing piercing. Before piercing starts, the machining head 1 is in a position apart from the workpiece 9, that is, in a position higher than the position shown in FIG. 1a. The piercing assist jig 10 is in an area where the piercing assist jig 10 can not interfere with the machining nozzle 2 even when it is moved upward. The piercing assist jig 10 is turned from a position shown in FIG. 1a for a predetermined angle by driving the rotary air cylinder 14 to thereby take a position in that area, and held beside the machining nozzle 2 by an action of the extendable air cylinder 15.

When piercing is to be performed, first the extendable air cylinder 15 is extended, and then the rotary air cylinder 14 is driven to turn the piercing assist jig 10 to make the center of the hole 11 of the piercing assist jig 10 coincide with the center of the hole of the machining nozzle 2. Then, the machining head 1 is moved to a position where the center of the hole of the machining nozzle 2 corresponds to a piercing position so that the center of the hole of the machining nozzle 2 may be placed in position above a to-be-pierced portion. Then, the machining head 1 is moved downward to press the piercing assist jig 10 onto the workpiece 9. Thus, the apparatus has been placed in position for piercing. In that state, the surface of the workpiece 9 is covered by the piercing assist jig 10 except for a portion corresponding to the hole 11 provided at the center of the piercing assist jig 10.

Piercing is started by working the laser 4, supplying the assist gas 6 and supplying also the blow gas 16. The laser beam 5 outputted from the laser 4 is concentrated by the convergent lens 3, made to pass through the hole of the machining nozzle 2, and applied to the piercing portion of the workpiece 9. At the same time that the laser beam is applied, the assist gas 6 introduced from the assist gas inlet 7 is jetted from the machining nozzle 2 to the workpiece 9.

By the laser beam 5, oxidation is caused at the workpiece 9, and piercing goes on by heating and melting due to combustion. Spatters and slugs produced in the process of piercing are blown off by the assist gas 6 and fly up over the piercing assist jig 10. Those flying-up spatters and slugs are cooled and blown off by the blow gas 16.

Since the arrangement is made such that the optical axis of the laser beam 5 applied from the hole of the machining nozzle 2, the axis of the assist gas 6 jet and the axis of the blow gas 16 jet do not intersect each other, the blow gas 16 does not affect the direction of the assist gas 6 jet jetted from the machining nozzle 2. Therefore, rise in supply pressure of the blow gas 16 does not produce harmful effects.

Further, since the blow gas 16 removes not only the spatters and slugs but also the heat produced in the process of piercing, a rise in temperature of the workpiece 9 is decreased. This ensures that steady and high-quality cutting can be performed after piercing.

As an example of piercing using the above described piercing assist jig 10, piercing was performed under the following conditions: the distance between the tip of the machining nozzle 2 and the workpiece 9 was 8 mm, the diameter of the hole 11 of the piercing assist jig 10 was 4 mm, the diameter of the hole of the machining nozzle was 1.5 mm, the assist gas 6 was oxygen and its supply pressure was 2 bar, the blow gas was air and its supply pressure was 2 bar, the blow gas jetting openings 12a, 12b were arranged 7 mm apart from the axis of the laser beam and assist gas jet and in a manner that the axes of jets produced by the blow gas jetting openings 12a, 12b were perpendicular to the axis of the laser beam and assist gas jet, the laser beam was outputted continuously and its power was 3 KW, and what was to be pierced was a steel plate of 25 mm in thickness. In that example, it took only about 2 sec to finish piercing. After the piercing assist jig 10 was removed from the surface of the workpiece, only a small amount of slugs and the like were found to adhere to the workpiece 9 near the pierced hole.

In contrast thereto, when piercing was performed under the same conditions except that the blow gas was jetted in a manner that the blow gas intersected the laser beam and the assist gas jet as in a conventional case, it took more than 5 sec to finish piercing, and piercing was unsteady. Further, the hole of the piercing assist jig 10 was deformed to be elliptical. It is believed that this was because the pressure of the blow gas 16 caused the flying-up melted metal and the oxygen as the assist gas 6 to gather on the leeward and effect abnormal combustion.

Figure 2A:
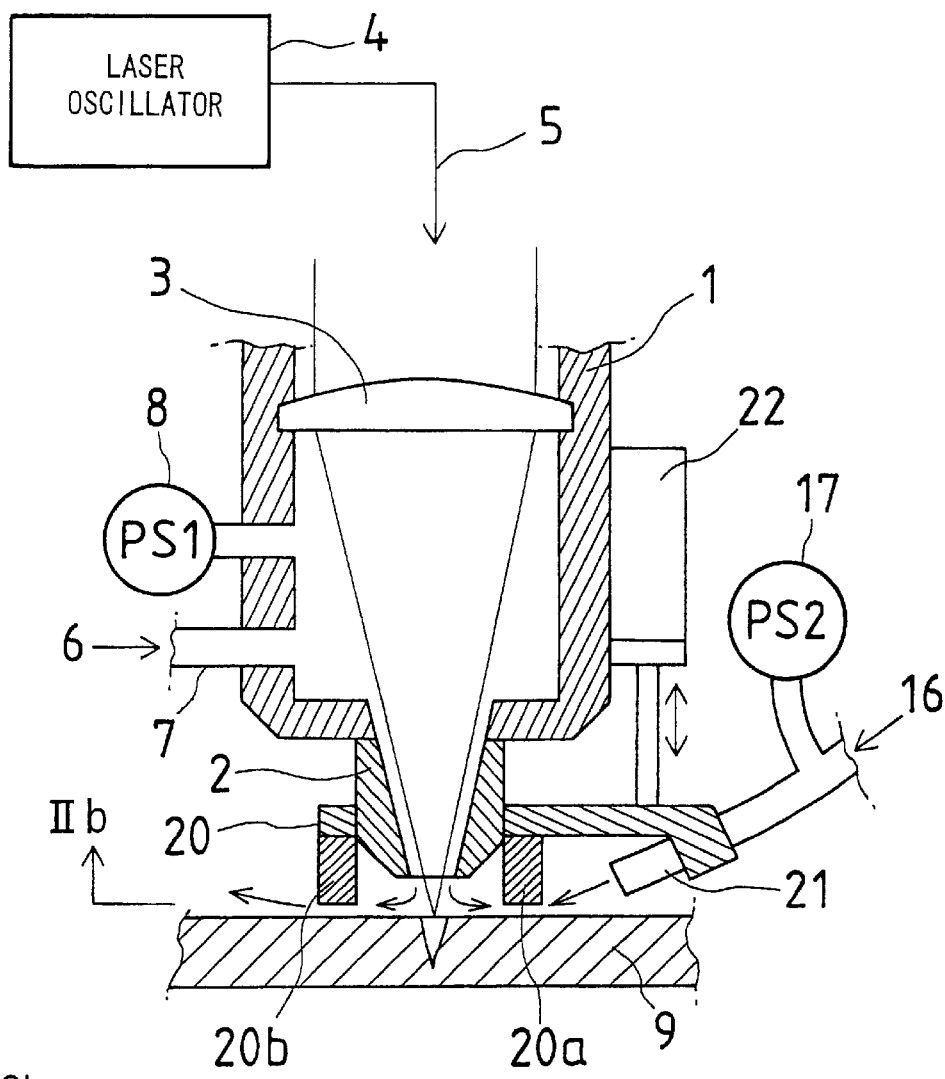
FIG. 2b is a cross-sectional view along a line indicated by an arrow IIb in FIG. 2a, FIG. 3a is a partially cutaway side view of a laser machining apparatus according to a third embodiment of the present invention.
Figure 2B:
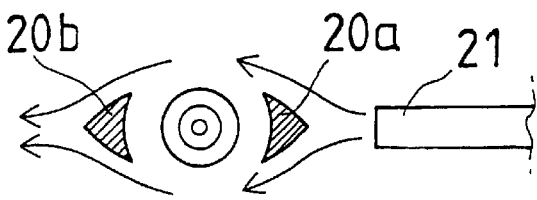

FIG. 2a is a schematic view of a second embodiment of the present invention, and FIG. 2b is a view as viewed in the direction indicated by an arrow IIb in FIG. 2a. The second embodiment differs from the first embodiment shown in FIGS. 1a, 1b in the piercing assist jig. Elements corresponding to those in the first embodiment will be denoted by corresponding reference numerals.

A piercing assist jig 20 has a hole in which a machining nozzle 2 is fitted. The machining nozzle 2 has a guide groove or protrusion (not shown) formed at its outer surface to extend in its axial direction, and the piercing assist jig 20 has a protrusion or groove formed at its face defining the hole in which the machining nozzle 2 is to be fitted, to correspond to the guide groove or protrusion. The piercing assist jig 20 is held in a manner that it can be slid in the machining nozzle 2's axial direction (vertical direction in FIG. 2a). The piercing assist jig 20 is joined to a piston rod of an air cylinder 22 which is attached to a machining head 1. The piercing assist jig 20 is moved up and down in FIG. 2a by the air cylinder 22. A blow gas nozzle 21 for jetting blow gas 16 to a to-be-pierced portion is attached to the piercing assist jig 20. The piercing assist jig 20 further comprises shield portions 20a, 20b for deflecting the blow gas 16 so that the blow gas 16 jet may not intersect assist gas 6 jetted from the machining nozzle 2.

Specifically, as shown in FIG. 2b, the arrangement is made such that when the central axis of the blow gas jet jetted from the blow gas nozzle 21 is projected on the workpiece 9 plane, a to-be-pierced portion is on that projected axis, and the shield portions 20a, 20b are also on that projected axis on the upstream and downstream sides with reference to the blow gas jet. The upstream-side shield portion 20a, projects to the upstream side so as to divide the blow gas jet into left and right streams and guide the streams in a maimer that they do not intersect the assist gas 6 jetted from the machining nozzle 2. The downstream-side shield portion 20b projects to the downstream side to make the blow gas flow smoothly. The downstream-side shield portion 20b does not always need to be provided. It is also to be noted that in the present embodiment, the blow gas 16 is jetted from the blow gas nozzle 21 not in the direction perpendicular to the upstream-side shield portion 20a, Instead, it is jetted obliquely downward from a slightly upper position as shown in FIG. 2a.

When piercing is not performed, the piston rod of the air cylinder 22 is contracted to draw up the piercing assist jig 20. Thus, the ends of the shield portions 20a, 20b do not project beyond the end of the machining nozzle 2. When piercing is to be performed, the piercing assist jig 20 is moved downward by an action of the air cylinder 22 to make the shield portions 20a, 20b project beyond the end face of the machining nozzle 2 toward the workpiece 9, and the machining head 1 is placed in position for piercing at the same time. (Alternatively, the piercing assist jig 20 is moved downward before or after the machining head 1 is placed in position for piercing.) The shield portions 20a, 20b may be brought in contact with the surface of the workpiece 9. In the present embodiment, the shield portions 20a, 20b are not brought in contact with the surface of the workpiece 9 but held leaving a small space as shown in FIG. 2a.

Then, piercing is started by working the laser 4 to output a laser beam 5 and supplying the assist gas 6 and the blow gas 16. In the present embodiment, the blow gas 16 jetted from the blow gas nozzle 21 is divided and deflected by the upstream-side shield portion 20a, As a result, the blow gas 16 forms streams which allow the optical axis of the laser beam applied to the to-be-pierced portion and the axis of the assist gas 6 jet to pass between the streams. Thus, the blow gas 16 does not intersect or hinder the assist gas 1 jet. Further, spatters and slugs flying up over the surface of the workpiece 9 in the process of piercing are cooled and blown off by the blow gas 16. Thus, they are removed from the surface of the workpiece 9 effectively. After the piercing is finished, if the blow gas is kept jetting for a while as the piercing assist jig 20 is moved upward by an action of the air cylinder 22, the slugs and the like adhering to the surface of the workpiece 9 between each shield portion 20a, 20b and the pierced hole can be also removed.

With the second embodiment, piercing was performed under the following conditions: the workpiece 9 was a soft steel plate of 12 mm in thickness, the laser beam was outputted continuously and its power was 6 KW, the assist gas was oxygen and its supply pressure was 5 bar, the diameter of the hole of the machining nozzle was 1.5 mm, the distance between the tip of the machining nozzle 2 and the workpiece 9 was 5 mm, the size of each shield portion 20a, 20b was 5 mm in the direction of its standing in the face of the blow gas and 10 mm in the direction of the axis of the blow gas flow, the distance between each shield portion 20a, 20b and the workpiece 9 was 0.5 mm, and the supply pressure of the blow gas was 2b ar. It took only about 1.5 sec to finish piercing.

Figure 3A:
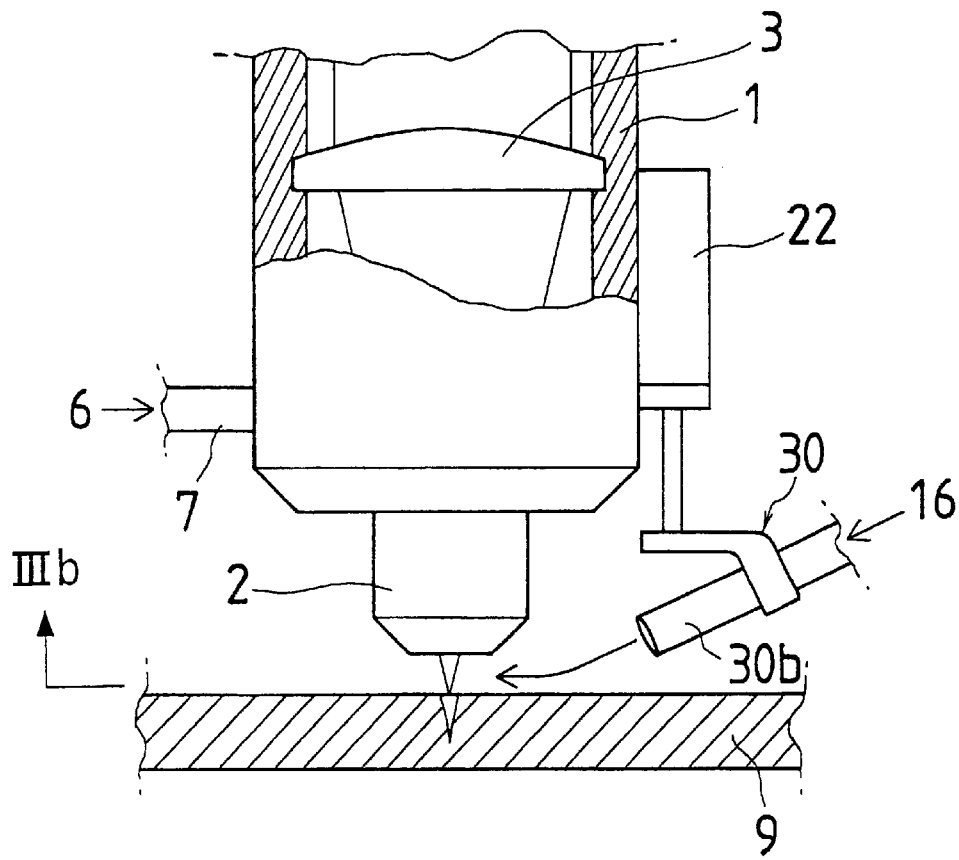
Figure 3B:
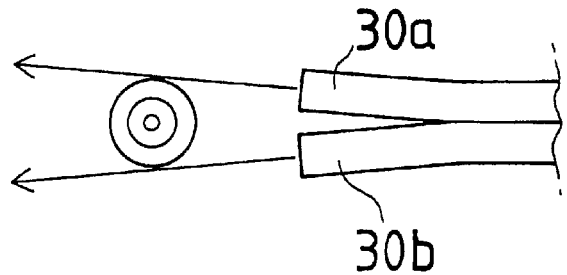

FIGS. 3a and 3b relate to a third embodiment of the present invention. The third embodiment is the simplest embodiment of the present embodiment, wherein only a blow gas supply means is added to a machining head 1 of a conventional laser machining apparatus.

An air cylinder 22 is attached to the machining head 1, and a blow gas supply means 30 is fixed to a piston rod of the air cylinder 22. A blow gas jetting piece attached to the blow gas supply means 20 comprises two blow gas nozzles 30a, 30b. The directions of the blow gas nozzles 30a, 30b jetting the blow gas are so determined that the blow gas jets jetted from the blow gas nozzles 30a, 30b form streams which allow the laser beam and the assist gas to pass between the streams. In the third embodiment, as shown in FIG. 3b, the axes of the blow gas 1 jets are not parallel but they extend diverging from each other in some degree. The blow gas nozzles 30a, 30b jet the blow gas so that the blow gas may impinge on a to-be-pierced portion of the workpiece 9 obliquely from a slightly upper position. Alternatively, the arrangement may be made such that the axes of the blow gas 1 jets jetted from the two blow nozzles 30a, 30b are parallel with each other and the blow gas 1 jets form streams which allow the laser beam 5 and the assist gas 6 to pass between the streams as in the first embodiment shown in FIGS. 1a, 1b. The structure of the machining head 1 and machining nozzle 2 is the same as that in the embodiment shown in FIGS. 2a, 2b. The explanation thereof will be therefore omitted.

In the present invention, the blow gas is supplied to form streams which allow the laser beam applied from the machining nozzle and the assist gas jetted from the machining nozzle to pass between the streams. Therefore, even when the supply pressure of the blow gas is raised, the blow gas does not hinder the assist gas jet, and effectively removes spatters and slugs flying up in the process of piercing. Further, the time required for piercing is not made longer, and the quality of a pierced hole is not deteriorated.

In the laser machining utilizing complicated thermal reaction including oxidation, steady cutting cannot be performed when the temperature of a to-be-cut workpiece is high, though it can be performed when the temperature of a workpiece is normal. In the present invention, since the blow gas removes not only slugs and spatters but also heat from a to-be-pierced portion, the temperature of the workpiece does not become high. Since the temperature of the workpiece varies little, steady cutting can be performed to the workpiece after it is pierced, and a high-quality machined surface can be obtained.

What is claimed is:

1. A laser machining apparatus comprising:

a machining nozzle to irradiate a laser beam on a workpiece; and gas jetting means for supplying a jet of gas between said machining nozzle and the workpiece, in a transverse direction with respect to an optical axis of the laser beam, such that streams of the jet of gas flow with an optical axis of said laser beam therebetween.

2. The laser machining apparatus according to claim 1, wherein said machining nozzle comprises an assist gas jetting means for supplying a jet of assist gas substantially coaxially with the laser beam.

3. The laser machining apparatus according to claim 1, wherein said gas jetting means comprises two nozzles to supply the streams of gas with their axes parallel to each other.

4. The laser machining apparatus according to claim 3, further comprising a jig to hold the two nozzles.

5. The laser machining apparatus according to claim 4, wherein said jig has a cutout in rectangular shape at a central portion thereof with an opening at the side opposite to the side to which the two nozzles are attached.

6. A laser machining apparatus according to claim 1, wherein said gas jetting means is disposed over the workpiece and at the side of said machining nozzle such that the jet of gas has an axis along a surface of the workpiece and is supplied from the side of said machining nozzle.

7. A laser machining apparatus comprising:

a machining nozzle to irradiate a laser beam on a workpiece;

gas jetting means for supplying a jet of gas between said machining nozzle and the workpiece in a transverse direction with respect to an optical axis of the laser beam, said gas jetting means being arranged such that the jet of gas flows along a surface of the workpiece and intersects with the optical axis of the laser beam; and shielding means, disposed between said gas jetting means and the optical axis of the laser beam, for shielding the jet of gas from said gas jetting means such that an axis of the jet of gas does not intersect the optical axis of said laser beam from said machining nozzle.

8. The laser machining apparatus according to claim 7, wherein said machining nozzle comprises an assist gas jetting means for supplying a jet of assist gas substantially coaxially with the laser beam.

9. The laser machining apparatus according to claim 7, further comprising a jig to hold a nozzle of said gas jetting means and said shielding means.

10. The laser machining apparatus according to claim 7, wherein said shielding means has a shape such that streams of the jet of gas flow with the optical axis of the laser beam therebetween.

11. A laser machining apparatus comprising:

a machining nozzle to irradiate a laser beam on a workpiece; and gas jetting unit to supply streams of gas over the workpiece, in a transverse direction with respect to an optical axis of the laser beam, such that the axis of the streams do not intersect an optical axis of said laser beam.

12. A laser machining apparatus comprising:

a machining nozzle to irradiate a laser beam on a workpiece;

gas jetting unit to supply a jet of gas over the workpiece in a transverse direction with respect to an optical axis of the laser beam, said gas jetting unit being arranged such that the jet of gas intersects with the optical axis of the laser beam; and shielding, disposed between said gas jetting unit and the optical axis of the laser beam, to shield the jet of gas from said gas jetting unit such that the axis of the jet of gas does not intersect the optical axis of the laser beam.

* * * * *